(12) United States Patent
Sharma et al.

(10) Patent No.: US 11,550,160 B1
(45) Date of Patent: Jan. 10, 2023

(54) OFF-AXIS PARABOLIC COMBINER

(71) Applicant: Meta Platforms Technologies, LLC, Menlo Park, CA (US)

(72) Inventors: Robin Sharma, Redmond, WA (US); Qi Zhang, Bellevue, WA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 408 days.

(21) Appl. No.: 16/186,442

(22) Filed: Nov. 9, 2018

(51) Int. Cl.
| | |
|---|---|
| *G02B 27/01* | (2006.01) |
| *G02B 3/08* | (2006.01) |
| *G02B 27/14* | (2006.01) |
| *G02B 3/00* | (2006.01) |

(52) U.S. Cl.
CPC .......... *G02B 27/0179* (2013.01); *G02B 3/08* (2013.01); *G02B 27/0172* (2013.01); *G02B 27/141* (2013.01); *G02B 2003/0093* (2013.01); *G02B 2027/0138* (2013.01); *G02B 2027/0174* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 5,706,136 | A * | 1/1998 | Okuyama | G02B 13/22 359/633 |
| 9,625,723 | B2 * | 4/2017 | Lou | G02B 27/017 |
| 2002/0196554 | A1 * | 12/2002 | Cobb | G02B 27/0172 359/633 |
| 2012/0068913 | A1 * | 3/2012 | Bar-Zeev | G02B 26/026 345/8 |
| 2014/0211146 | A1 * | 7/2014 | Gupta | G02B 5/1861 351/158 |
| 2015/0138451 | A1 * | 5/2015 | Amitai | G02B 27/0179 349/11 |
| 2015/0293358 | A1 * | 10/2015 | de Matos Pereira Vieira | G02B 5/32 359/13 |
| 2016/0109712 | A1 * | 4/2016 | Harrison | G02B 27/30 359/630 |
| 2018/0003972 | A1 * | 1/2018 | Kress | G02B 5/09 |
| 2018/0239146 | A1 * | 8/2018 | Bierhuizen | G02B 27/0093 |
| 2018/0348527 | A1 * | 12/2018 | Potnis | G02B 27/0955 |

* cited by examiner

*Primary Examiner* — Christopher Stanford
*Assistant Examiner* — Journey F Sumlar
(74) *Attorney, Agent, or Firm* — Freestone Intellectual Property Law PLLC; Aaron J. Visbeek (57) ABSTRACT

An off-axis optical combiner includes a parabolic lensing structure that selects collimated infrared image light received from an eyebox area for focusing to a focus of the off-axis optical combiner. Selecting the collimated infrared image light for focusing allows the parabolic lensing structure to form a same-sized image of an object having variable depth from the parabolic lensing structure.

17 Claims, 10 Drawing Sheets

OFF-AXIS PARABOLIC COMBINER

TECHNICAL FIELD

This disclosure relates generally to optics and in particular to optical combiners.

BACKGROUND INFORMATION

Optical combiners are utilized in a variety of contexts including for use in head mounted displays (HMD). Typically, optical combiners allow a user to view incident scene light from an external environment while also providing optical structures that allow for imaging of the eye or to present images to the eye. In the context of eye-tracking, it is desirable to capture consistent images of the eye.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an optical comber and systems that include an optical combiner are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

The optic combiner and head mounted display (HMD) described in this disclosure allows a camera to capture improved images of an eye of a wearer of an HMD even when the depth of the eye (eye-relief) from the optical combiner changes. The optical combiner in the disclosure may be described as "telecentric" because a size of the image of the eye may remain constant even as the depth of the eye from the optical combiner varies. In other words, the optical combiner may make it appear, from the perspective of the camera, that the eye is the same object distance even when the depth of field of the eye changes. The optical combiner may achieve this by selectively focusing collimated image light to redirect to a camera for capturing an image of the eye. Since the collimated image light is selected by the optical combiner, an imaging system that includes a telecentric optical combiner is much less sensitive to a depth translation of the eye from the telecentric optical combiner.

The telecentric optical combiner may include an off-axis two-dimensional parabolic lensing structure that selectively focuses received collimated imaging light. The focus of the optical combiner may be at an entrance pupil of a camera for purposes of capturing images. The parabolic lensing structure may function as an off-axis reflector for infrared light while passing visible light.

The parabolic lensing structure may include an off-axis two-dimensional parabolic Fresnel structure that conforms to a two-dimensional parabolic curvature. A dichroic reflective layer may be disposed over the two-dimensional parabolic Fresnel structure to reflect infrared imaging light to the camera while passing visible scene light. Facets of the two-dimensional parabolic Fresnel structure may have variable pitch and variable angles. In one embodiment, the parabolic lensing structure includes a hologram configured to selectively focus the collimated imaging light. These and other embodiments are described in detail with respect to FIGS. 1A-6.

Figure 1A:
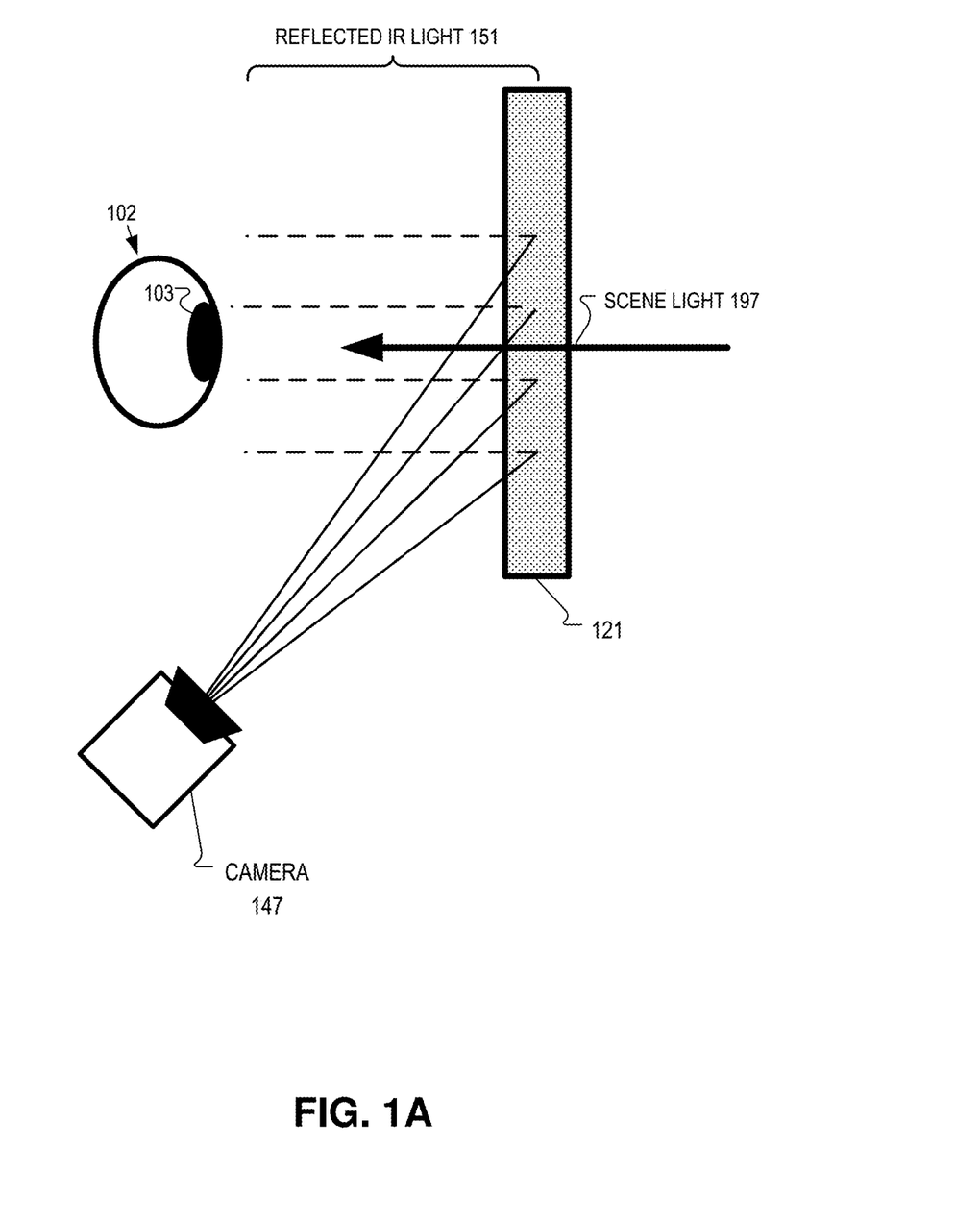
FIG. 1A illustrates an optical combiner that directs reflected infrared light to a camera while allowing scene light to propagate through the optical combiner to the eye.

FIG. 1A illustrates an optical combiner 121 that directs reflected infrared light 151 to camera 147 while allowing scene light 197 to propagate through optical combiner 121 to eye 102. Camera 147 may be a CMOS image sensor that includes a filter that passes infrared light while rejecting visible light (e.g. wavelength of 380 nm-730 nm). Eye 102 includes pupil 103 and may be illuminated by infrared light emitted from a diode include in an HMD. Camera 147 may be configured to image eye 102 to determine a position of pupil 103 for eye-tracking purposes.

Figure 1B:
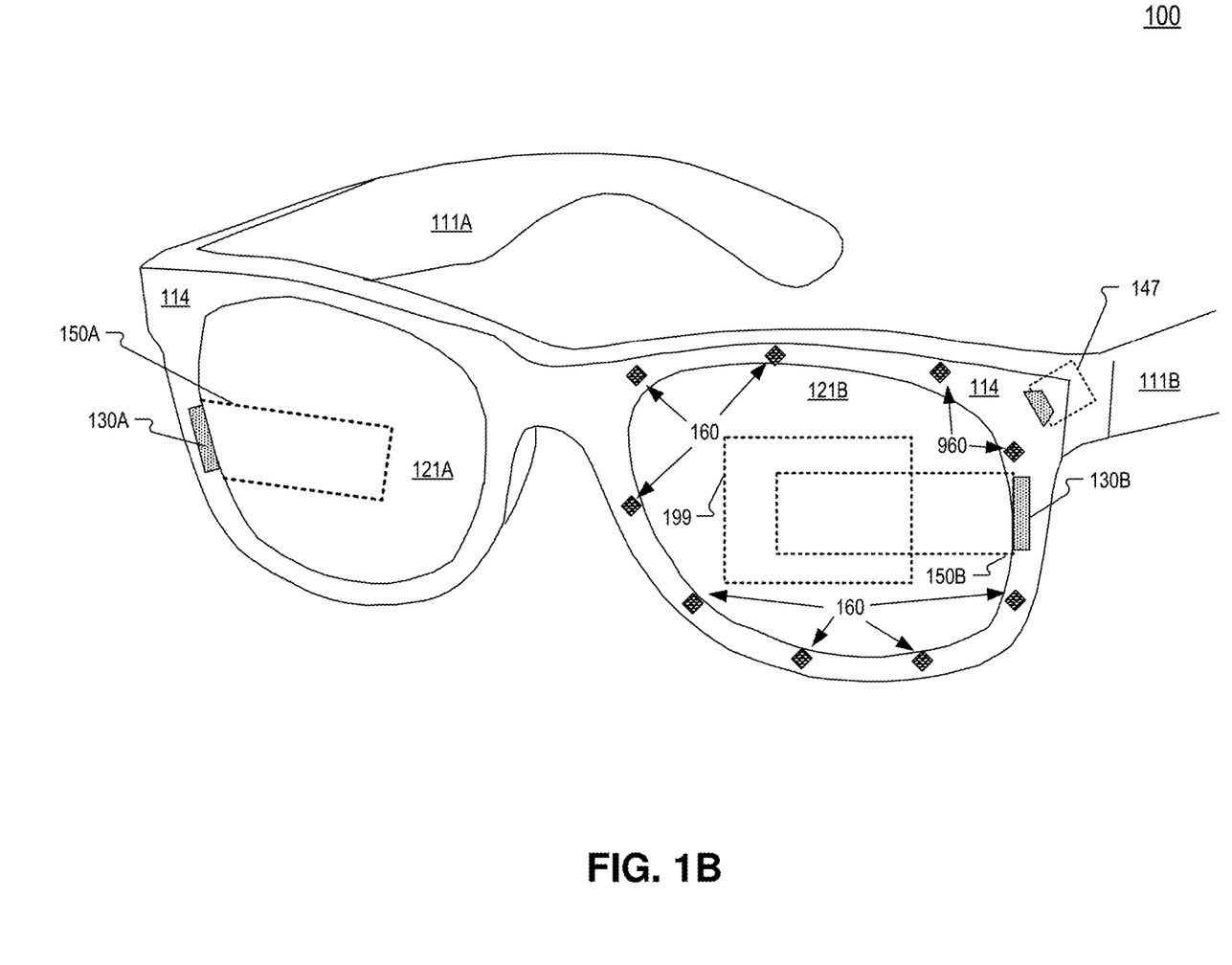
FIG. 1B illustrates an example HMD that includes an optical combiner for directing infrared light reflected off an eye to a camera, in accordance with an embodiment of the disclosure.

FIG. 1B illustrates an example HMD 100 that includes optical combiner 121 for directing infrared light reflected off an eye to camera 147, in accordance with an embodiment of the disclosure. HMD 100 includes frame 114 coupled to arms 111A and 111B. Optical combiners 121A and 121B are mounted to frame 114. Optical combiners 121 may include prescription lenses matched to a particular wearer of HMD or non-prescription lenses. The illustrated HMD 100 is configured to be worn on or about a head of a user of the HMD.

Each optical combiner 121 may include a waveguide 150 to direct display light generated by a display 130 to an eyebox area for viewing by a wearer of HMD 100. Display 130 may include an LCD, an organic light emitting diode (OLED) display, micro-LED display, quantum dot display, pico-projector, or liquid crystal on silicon (LCOS) display for directing display light to a wearer of HMD 100.

The frame 114 and arms 111 of the HMD 100 may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Optical combiner 121 may appear transparent to a user to facilitate augmented reality or mixed reality where a user can view scene light (e.g. 197) from the environment around her while also receiving display light directed to her eye(s) by waveguide(s) 150. In some embodiments, image light is only directed into one eye of the wearer of HMD 100. In an embodiment, both displays 130A and 130B are included to direct display light into waveguides 150A and 150B, respectively.

The example HMD 100 of FIG. 1B includes an array of optional infrared emitters (e.g. infrared LEDs) 160 disposed around a periphery of combiner 121B in frame 114. The infrared emitters 160 emit infrared light in an eyeward direction to illuminate an eye of a wearer of HMD 100 with infrared light. In one embodiment, the infrared light is centered around 850 nm. Infrared light from other sources may illuminate the eye as well. The infrared light may reflect off the eye and be received by parabolic lensing structure 199. In an embodiment, parabolic lensing structure 199 includes a hot mirror layer configured to reflect infrared light to camera 147 while passing visible scene light to an eyebox area. Parabolic lensing structure 199 may be considered an off-axis lensing shape to direct the reflected infrared light to camera 147. In this way, camera 147 is able to image the eye of a wearer of HMD 100. Camera 147 may be mounted on the inside of the temple of HMD 100 to image light reflected/focused by parabolic lensing structure 199. The images of the eye captured by camera 147 may be used for eye-tracking purposes. The parabolic lensing structure 199 can be included in combiner 121 as covering the whole waveguide 150 or covering a portion of waveguide(s) 150. Although camera 147, infrared emitters 160, and parabolic lensing structure 199 are illustrated on only one side of HMD 100, they of course may be duplicated on the other side of HMD 100 to facilitate infrared imaging of both eyes of a wearer of HMD 100.

Figure 2A:
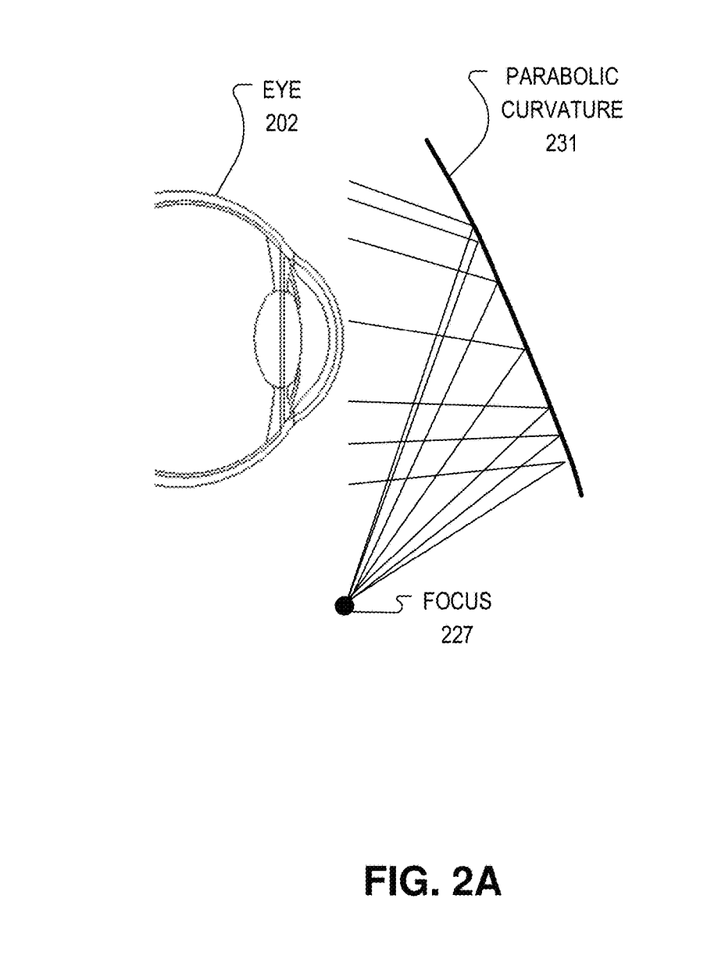
FIG. 2A includes a parabolic curvature for focusing light.
Figure 2B:
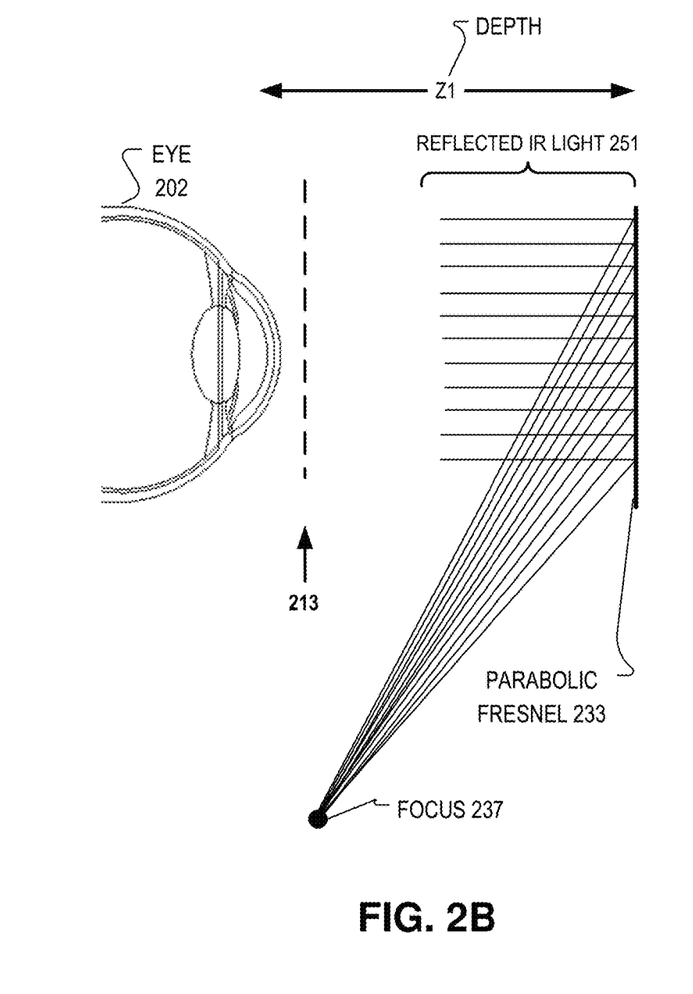
FIG. 2B illustrates a parabolic Fresnel structure for focusing light to a focus of the parabolic Fresnel structure, in accordance with an embodiment of the disclosure.

FIG. 2A includes a parabolic curvature 231 that reflects and focuses infrared light reflected by eye 202 to a focus 227. Parabolic curvature 231 may be a section of a two-dimensional parabolic curvature. FIG. 2B illustrates an off-axis parabolic Fresnel structure 233, in accordance with an embodiment of the disclosure. Off-axis parabolic Fresnel structure 233 may be a two-dimensional parabolic optical surface decomposed into its Fresnel form having Fresnel facets disposed along a common plane. Hence, off-axis parabolic Fresnel structure 233 may conform to a two-dimensional parabolic curvature that focuses collimated reflected infrared image light 251 to a focus 237 of the off-axis parabolic Fresnel structure 233.

Fresnel structure 233 selectively focuses collimated infrared image light 251 to a focus 237. Collimated infrared image light 251 may be normal (or nearly normal) to an object plane 213 of an optical system that includes Fresnel structure 233 and a camera having an entrance pupil at the focus 237. Collimated infrared image light 251 may be normal (or nearly normal) to a plane common to Fresnel facets of off-axis parabolic Fresnel structure 233. Fresnel structure 233 is configured to selectively focus collimated infrared image light 251 although Fresnel structure 233 may reflect infrared image light that is not collimated infrared image light 251 to locations other than focus 237. Fresnel structure 233 is configured to be telecentric because, by selectively focusing the collimated infrared image light 251 that is normal to the object plane 213, magnification is independent of object distance. Hence, an image of eye 202 captured by a camera with an entrance pupil at focus 237 will have the same magnification regardless of the depth Z1 of the eye 202 from off-axis parabolic Fresnel structure 233. The off-axis parabolic Fresnel structure 233 may be included in an optical combiner such as optical combiner 121 as the parabolic lensing structure 199.

Figure 3A:
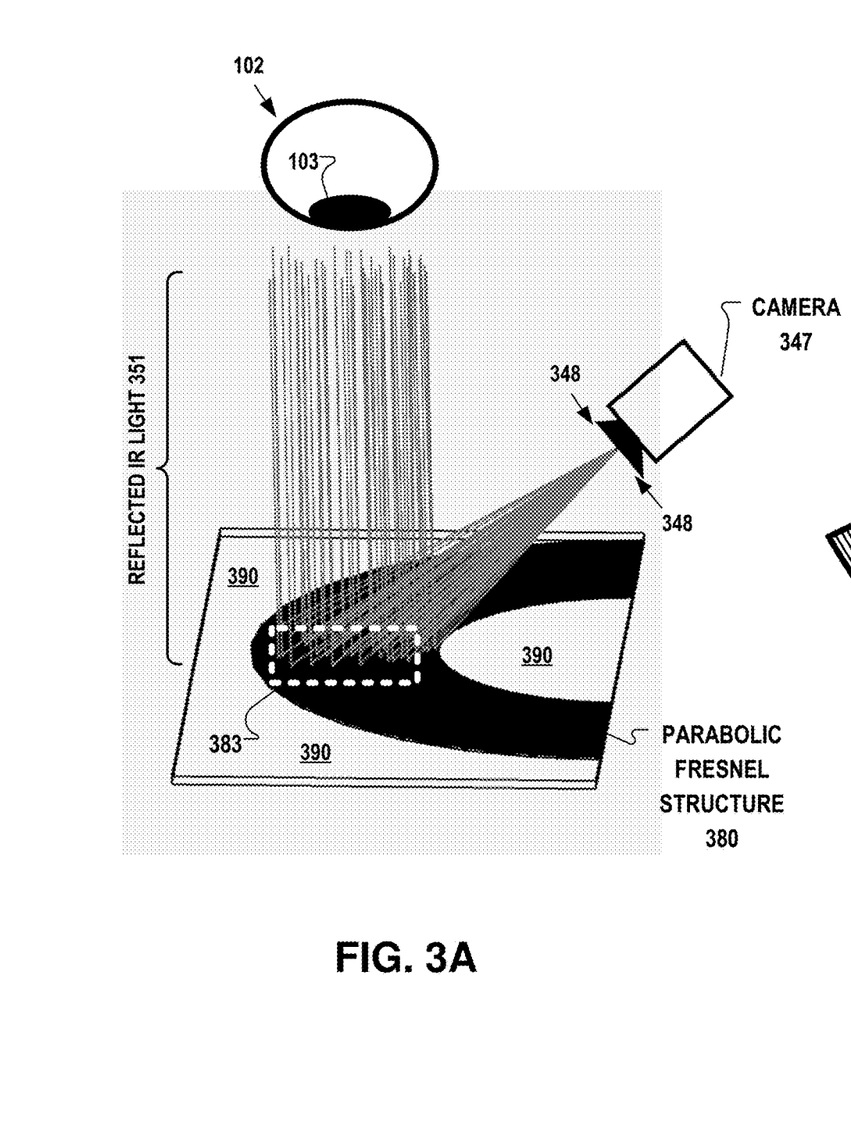
FIGS. 3A-3E illustrate example parabolic Fresnel structures for focusing light, in accordance with embodiments of the disclosure.

FIG. 3A illustrates a two-dimensional parabolic Fresnel structure 380 including a two-dimensional parabolic Fresnel section 383, in accordance with embodiments of the disclosure. Two-dimensional parabolic Fresnel section 383 may be used as parabolic Fresnel structure 233. Facets of two-dimensional parabolic Fresnel structure 380 are formed in a common plane 390. In FIG. 3A, two-dimensional parabolic Fresnel section 383 focuses reflected infrared image light 351 to an entrance pupil 348 of camera 347. Light 351 may have the same characteristics as light 251 described in connection with FIG. 2B.

Figure 3B:
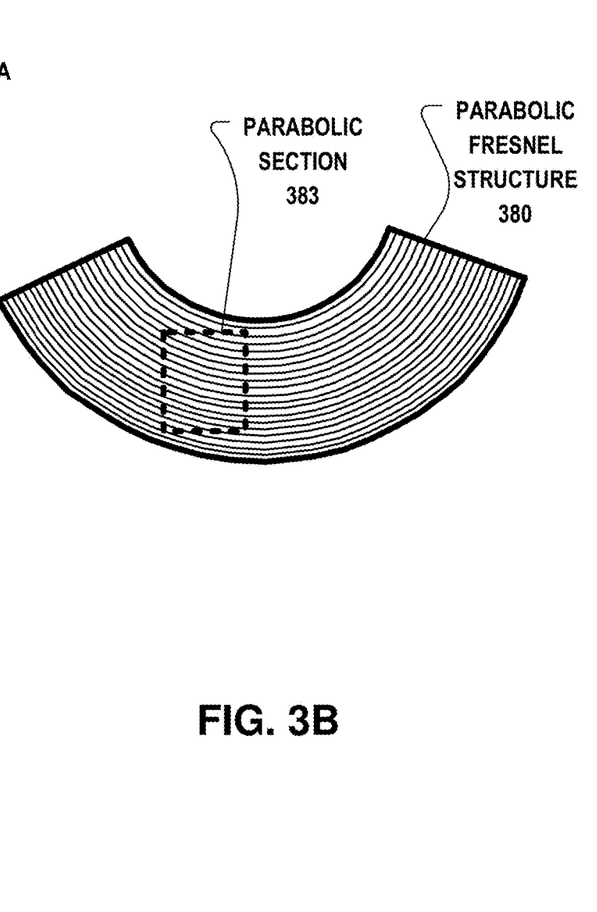
Figure 3C:
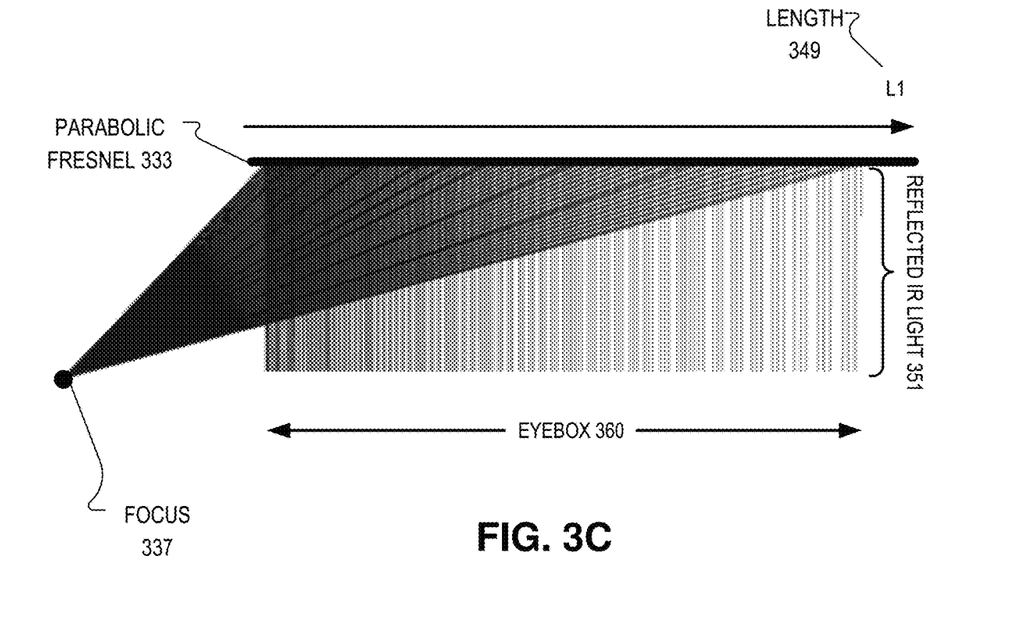

FIG. 3B illustrates a top view of parabolic Fresnel structure 380 that includes two-dimensional parabolic Fresnel section 383. FIG. 3C illustrates a side view of an off-axis parabolic Fresnel structure 333 that may include two-dimensional parabolic Fresnel section 383. Off-axis parabolic Fresnel structure 333 focuses collimated infrared image light 351 reflected from eyebox area 360 to focus 337. FIG. 3C also illustrates that a length (L1) 349 of Fresnel structure 333 increases as it gets farther from focus 337.

Figure 3D:
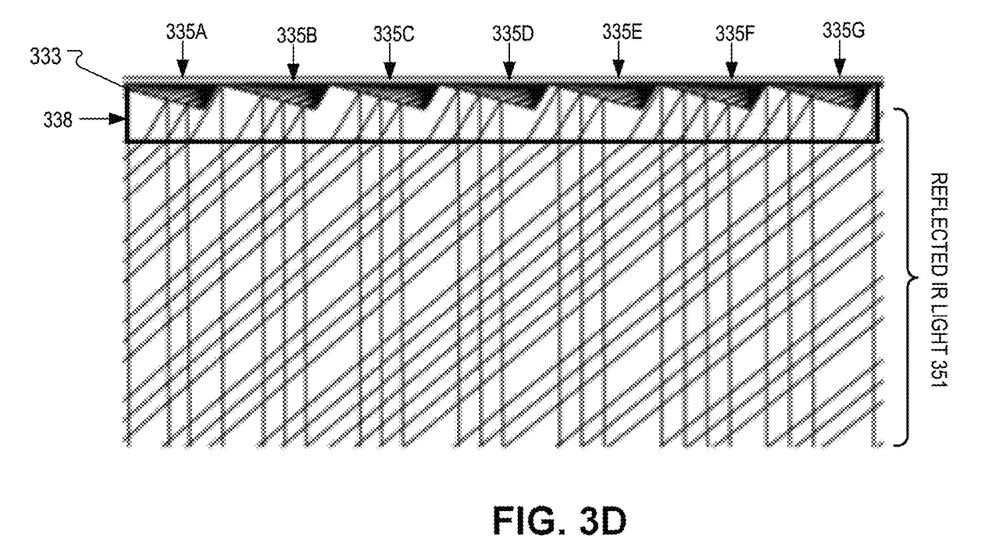

FIG. 3D illustrates a zoomed in side view of a portion of off-axis parabolic Fresnel structure 333. FIG. 3D illustrates example Fresnel facets 335A-G. FIG. 3D also illustrates that a refractive layer 338 may be included in an optical combiner that includes Fresnel structure 333. FIG. 3D shows a portion of off-axis parabolic Fresnel structure 333 selectively focusing collimated infrared light 351 to focus 337 (not illustrated in FIG. 3D). Infrared light other than collimated infrared light 351 may also be reflected by structure 333 but not directed to focus 337.

Figure 3E:
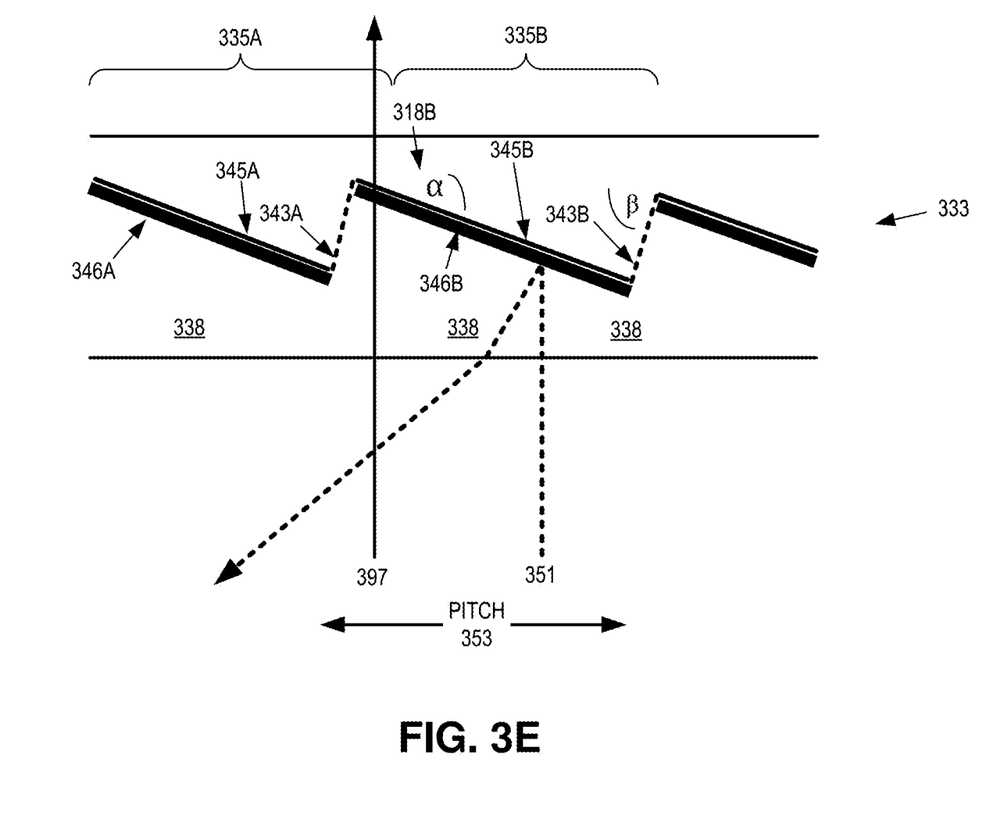

FIG. 3E illustrates a further zoomed in view of example facets 335A and 335B. Each facet 335 includes a draft surface 343 and an active surface 345. Active surface 345 is supported by an active angle ($\alpha$) 318 and draft surface 343 is supported by a draft angle ($\beta$) 319. A dichroic reflective layer 346 may be disposed over the active surface 345 of each facet 335 to reflect infrared light 351. In FIG. 3E, dichroic reflective layer 346 is disposed between refractive layer 338 and off-axis two-dimensional parabolic Fresnel structure 333 that includes facets 335. Dichroic reflective layer 346 may be configured to pass visible scene light 397 to an eyebox area 360 while reflecting light 351. In an embodiment, dichroic reflective layer 346 is configured to reflect narrow-band infrared light that is emitted by the infrared emitters 160 of FIG. 1B.

Figure 4A:
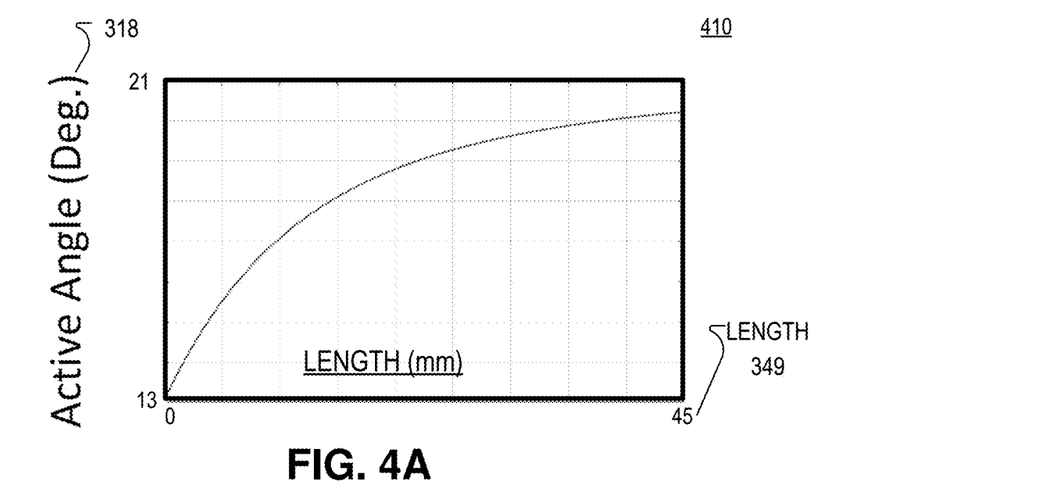
FIGS. 4A-4E illustrate various example variable pitch and variable angle graphs for facets in a parabolic Fresnel structure, in accordance with embodiments of the disclosure.

The Fresnel facets 335 of off-axis two-dimensional parabolic Fresnel structure 333 may have a variable pitch 353 and the variable angle with respect to length 349 to form a parabolic Fresnel structure. In one embodiment, the active angle 318 of the Fresnel facets 335 progressively increases as length 349 increases. Therefore, in some embodiments, the active angle 318 of the Fresnel facets 335 progressively increases as a distance from the entrance pupil 348 of camera 347 increases. FIG. 4A illustrates an example graph 410 illustrating an example relationship between an active angle 318 of facets 335 as a length 349 increases from 0 mm to 45 mm. Over the length 349, the active angle 318 progressively increases from 13 degrees at 0 mm to over 20 degrees at 45 mm.

Figure 4B:
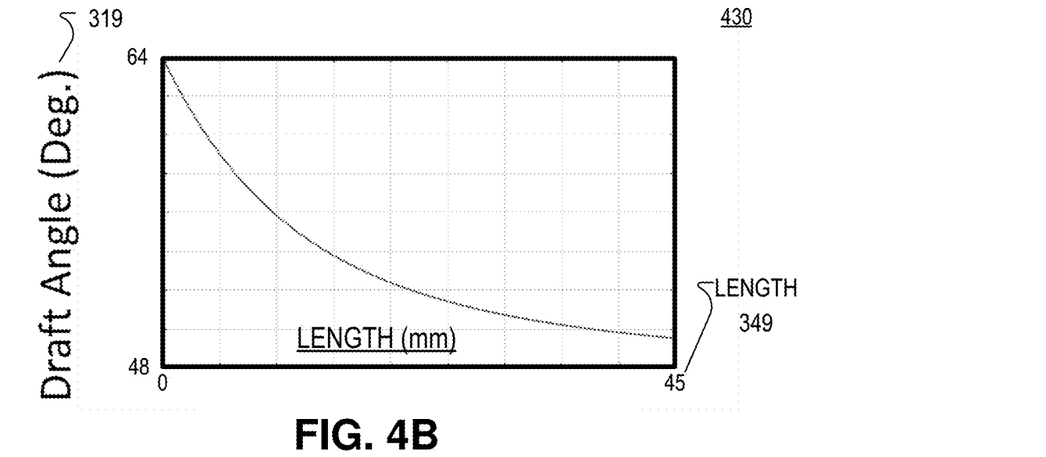

FIG. 4B illustrates an example graph 430 illustrating an example relationship between a draft angle 319 of facets 335 as a length 349 increases from 0 mm to 45 mm. Over the length 349, the draft angle 319 progressively decreases from 64 degrees at 0 mm to less than 50 degrees at 45 mm.

Figure 4C:
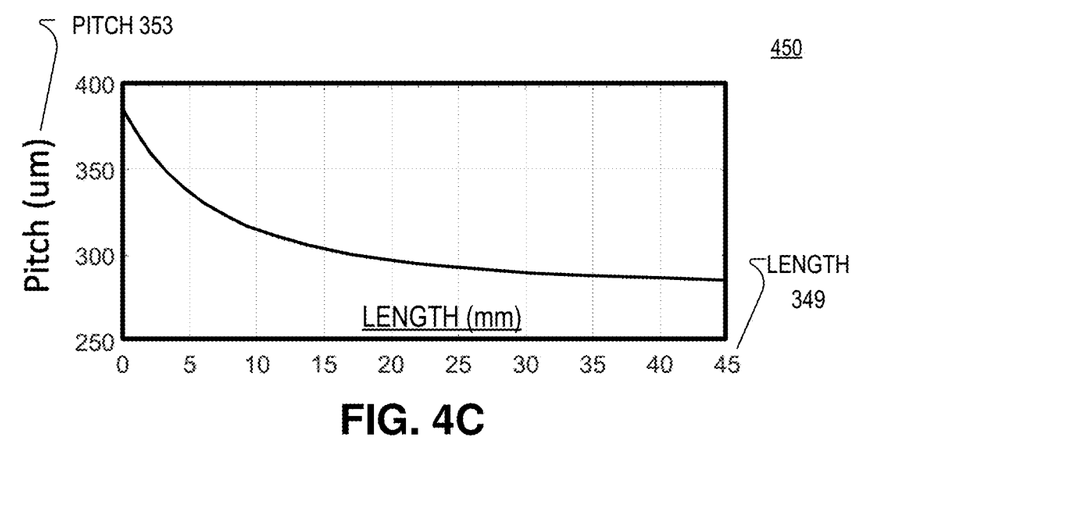

FIG. 4C illustrates an example graph 450 illustrating an example relationship between a pitch 353 of facets 335 as a length 349 increases from 0 mm to 45 mm. Over the length 349, the pitch 353 progressively decreases from over 375 um at 0 mm to less than 290 um at 45 mm.

Figure 4D:
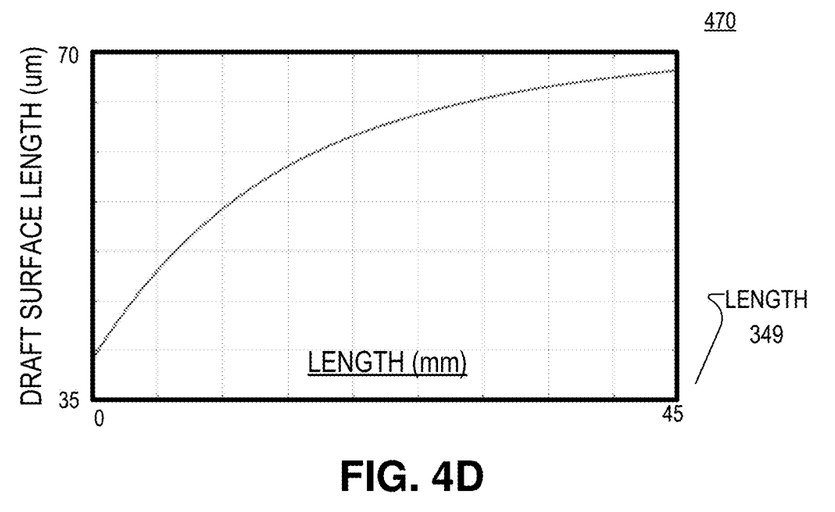

FIG. 4D illustrates an example graph 470 illustrating an example relationship between a draft surface length (also known as "shade length") of draft surface 343 of facets 335 as a length 349 increases from 0 mm to 45 mm. Over the length 349, the draft surface length progressively increases from less than 40 um at 0 mm to approximately 68 um at 45 mm.

Figure 4E:
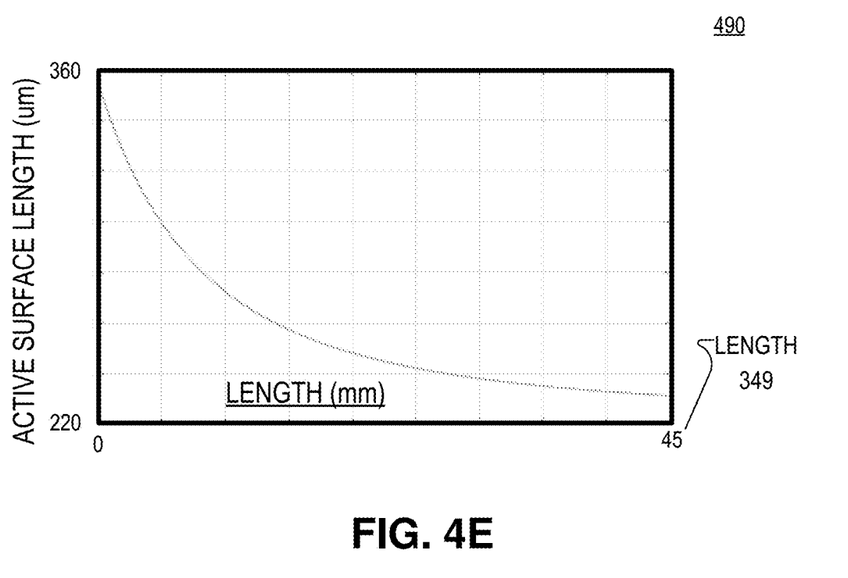

FIG. 4E illustrates an example graph 490 illustrating an example relationship between an active surface length of active surface 345 of facets 335 as length 349 increases from 0 mm to 45 mm. Over the length 349, the active surface length progressively decreases from more than 350 um at 0 mm to approximately 233 um at 45 mm.

Figure 5:
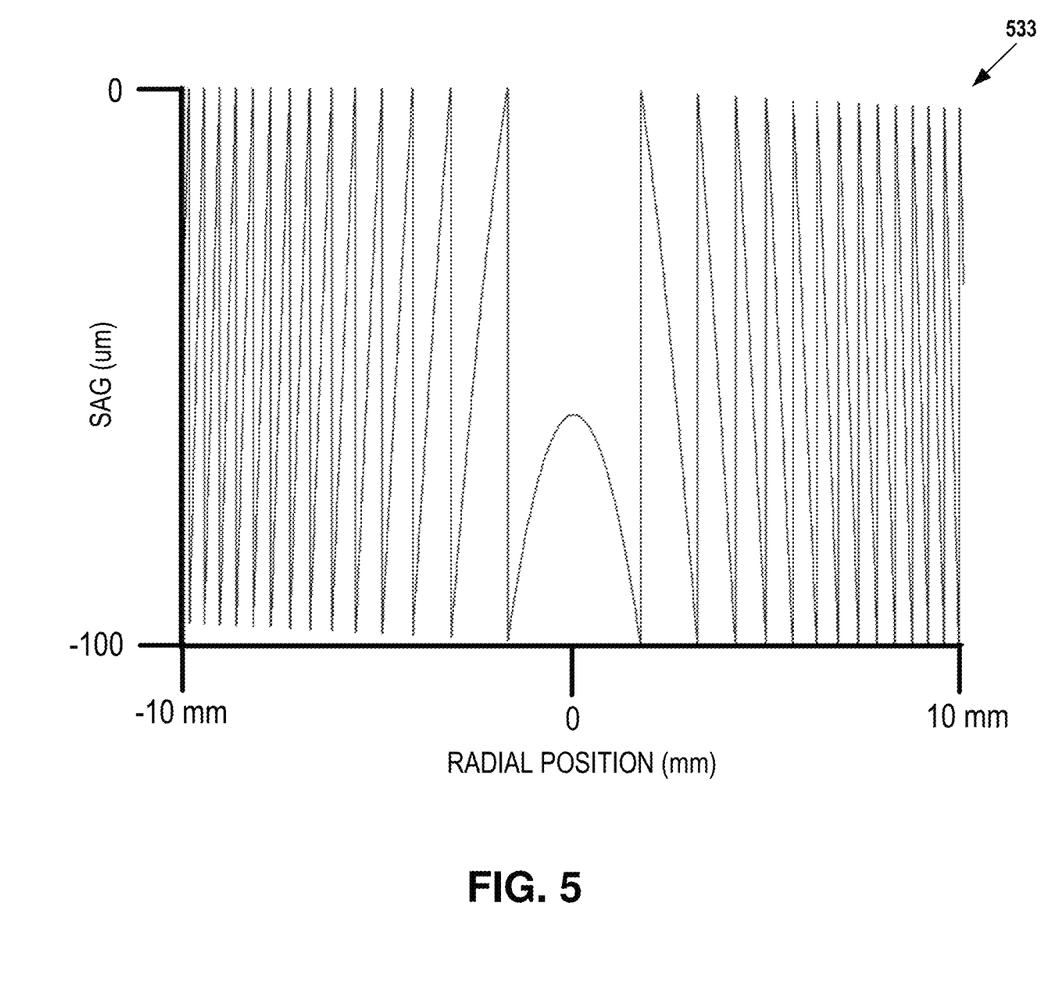
FIG. 5 illustrates an example sag plot of an example parabolic Fresnel structure, in accordance with an embodiment of the disclosure.

FIG. 5 illustrates an example sag plot of an example off-axis parabolic Fresnel structure 533, in accordance with an embodiment of the disclosure. The example sag plot of an example parabolic Fresnel structure 533 illustrates a sag from 0 to −100 um over a radial position from −10 mm to 10 mm.

Figure 6:
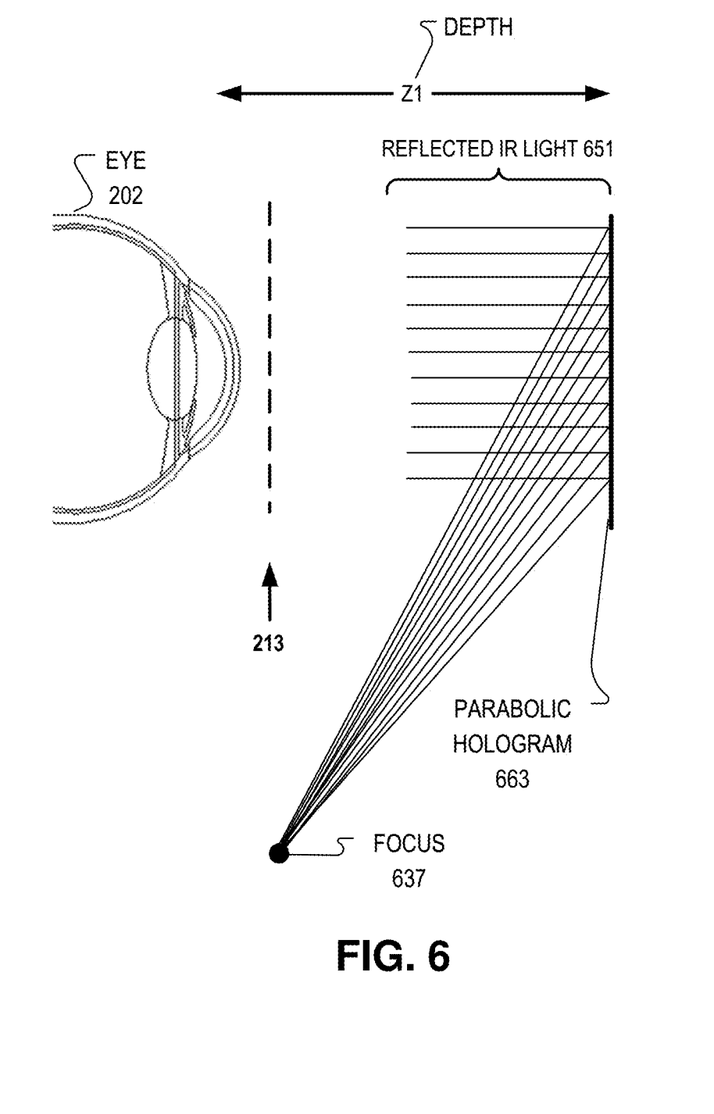
FIG. 6 illustrates an example parabolic hologram for focusing infrared light for imaging by a camera, in accordance with an embodiment of the disclosure.

FIG. 6 illustrates an example parabolic hologram for focusing infrared light to a focus of the parabolic hologram for imaging by a camera, in accordance with an embodiment of the disclosure. Parabolic hologram 663 may include a volume hologram that includes Bragg gratings. Parabolic hologram 663 may be configured similarly to off-axis parabolic Fresnel structure 233 in that parabolic hologram 663 may utilize an off-axis parabolic lensing structure to selectively focus collimated reflected infrared light 651 to focus 637 and therefore be considered telecentric. Parabolic hologram 663 may include an interference pattern that when illuminated by collimated reflected infrared light 651, focuses collimated reflected infrared light 651 to the focus 637. Fabricating parabolic hologram 663 may include interfering a reference beam and an object beam having the same narrow-band infrared wavelength as infrared emitters 160 so that the collimated reflected infrared light 651 (reflecting off of eye 202) includes the proper narrow-band infrared wavelength to illuminate the interference pattern and be focused to focus 637.

Whether an HMD such as HMD 100 includes a telecentric parabolic Fresnel structure 233 or telecentric parabolic hologram 633 in an optical combiner, the imaging of the eye of a wearer of the HMD will be improved since the image size of the eye will not vary with respect to the depth of the eye from the optical combiner. This feature is beneficial because different face shapes among different demographics of HMD wearers may create large differences in the depth of the eye (eye relief) from the optical combiner and getting a similar sized image of a wearer's eye may improve eye-tracking systems of the HMD.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD), comprising:
a camera having an entrance pupil; and
an off-axis optical combiner to be positioned in a field of view of a user of the HMD, wherein the off-axis optical combiner includes a parabolic lensing structure that operates as a parabolic curvature having a focus, wherein the parabolic lensing structure focuses collimated infrared image light, received from an eyebox area, to the focus and reflects other infrared light to at least one location other than the focus, wherein the entrance pupil of the camera is located at the focus, and wherein the collimated infrared image light is normal to an object plane of an optical system including the camera and the parabolic lensing structure.

2. The HMD of claim 1, wherein the parabolic lensing structure includes a two-dimensional parabolic Fresnel structure that conforms to a two-dimensional parabolic curvature, and wherein the parabolic lensing structure further includes a dichroic reflective layer disposed over the two-dimensional parabolic Fresnel structure, and wherein the dichroic reflective layer reflects infrared light and passes visible light.

3. The HMD of claim 2, wherein Fresnel facets of the two-dimensional parabolic Fresnel structure are of variable pitch and variable angle.

4. The HMD of claim 3, wherein an active angle of the Fresnel facets progressively increases as a distance from the entrance pupil of the camera increases.

5. The HMD of claim 3, wherein the variable pitch of the Fresnel facets progressively decreases as a distance from the entrance pupil of the camera increases.

6. The HMD of claim 2, wherein the off-axis optical combiner further includes a refractive layer, and wherein the dichroic reflective layer is disposed between the refractive layer and the two-dimensional parabolic Fresnel structure.

7. The HMD of claim 1, wherein the parabolic lensing structure includes a hologram configured to select the collimated infrared image light for focusing.

8. The HMD of claim 7, wherein the hologram includes a volume hologram.

9. The HMD of claim 8 further comprising:
an infrared emitter configured to illuminate the eyebox area with narrow-band infrared light, wherein the volume hologram is configured to focus the narrow-band infrared light to the entrance pupil of the camera located at the focus.

10. The HMD of claim 1, wherein the camera is disposed near a temple area of the HMD.

11. The HMD of claim 1 further comprising:
an infrared emitter configured to illuminate the eyebox area with narrow-band infrared light, wherein a dichroic reflective layer of the parabolic lensing structure is configured to reflect the narrow-band infrared light to the entrance pupil of the camera located at the focus.

12. The HMD of claim 1, wherein the camera is configured to capture an image of an eye of the user based on the collimated infrared image light received from the eyebox area, and wherein the off-axis optical combiner is configured to be telecentric so that by selectively focusing the collimated infrared image light to the focus where the entrance pupil of the camera is located, the image of the eye has a same magnification regardless of a depth of the eye relative to the off-axis optical combiner.

13. An off-axis optical combiner comprising:
a refractive layer configured to pass visible scene light to an eye; and
a parabolic lensing structure that operates as a parabolic curvature having a focus where an entrance pupil of a camera is located, wherein the parabolic lensing structure selects infrared image light, received from an eyebox area, to direct to the focus where the entrance pupil of the camera is located and reflects other infrared light to at least one location other than the focus, wherein selection of the infrared image light to direct to the focus allows the parabolic lensing structure to form a same-sized image of an object having variable depth from the parabolic lensing structure, and wherein the parabolic lensing structure includes a hologram configured to select the infrared image light to direct to the focus.

14. The off-axis optical combiner of claim 13, wherein the hologram is configured to focus narrow-band infrared light.

15. The off-axis optical combiner of claim 13, wherein the same-sized image of an object is a same-sized image of an eye of a user of a device that includes the off-axis optical combiner, and wherein the camera is configured to capture an image of the eye of the user based on the infrared image light received from the eyebox area, and wherein the off-axis optical combiner is configured to be telecentric so that by selectively focusing the infrared image light to the focus where the entrance pupil of the camera is located, the image of the eye has a same magnification regardless of a depth of the eye relative to the off-axis optical combiner.

16. A head mounted display (HMD), comprising:
a camera having an entrance pupil; and
an off-axis optical combiner to be positioned in a field of view of a user of the HMD, wherein the off-axis optical combiner includes a parabolic lensing structure that operates as a parabolic curvature having a focus, wherein the parabolic lensing structure focuses collimated infrared image light, received from an eyebox area, to the focus, wherein the entrance pupil of the camera is located at the focus, wherein the parabolic lensing structure includes a hologram configured to select the collimated infrared image light to focus to the focus and to direct other infrared light to at least one location other than the focus.

17. The HMD of claim 16, wherein the camera is configured to capture an image of an eye of the user based on the collimated infrared image light received from the eyebox area, and wherein the off-axis optical combiner is configured to be telecentric so that by selectively focusing the collimated infrared image light to the focus where the entrance pupil of the camera is located, the image of the eye has a same magnification regardless of a depth of the eye relative to the off-axis optical combiner.

* * * * *